US010909701B2

(12) United States Patent
Chen et al.

(10) Patent No.: US 10,909,701 B2
(45) Date of Patent: Feb. 2, 2021

(54) METHOD FOR DATA ACQUISITION AND IMAGE PROCESSING FOR RECONSTRUCTING A SUPER-RESOLVED IMAGE

(71) Applicant: The Chinese University of Hong Kong, Hong Kong (CN)

(72) Inventors: Shih-Chi Chen, Hong Kong (CN); Yunlong Meng, Hong Kong (CN); Jialong Chen, Hong Kong (CN)

(73) Assignee: The Chinese University of Hong Kong, Hong Kong (CN)

(*) Notice: Subject to any disclaimer, the term of this patent is extended or adjusted under 35 U.S.C. 154(b) by 77 days.

(21) Appl. No.: 16/455,199

(22) Filed: Jun. 27, 2019

(65) Prior Publication Data

US 2020/0410700 A1 Dec. 31, 2020

(51) Int. Cl.
| G06K 9/00 | (2006.01) |
| G06T 7/521 | (2017.01) |
| G06T 5/00 | (2006.01) |
| G06T 5/50 | (2006.01) |
| G06T 5/20 | (2006.01) |

(52) U.S. Cl.
CPC .............. *G06T 7/521* (2017.01); *G06T 5/002* (2013.01); *G06T 5/20* (2013.01); *G06T 5/50* (2013.01)

(58) Field of Classification Search
CPC ............ G06T 7/521; G06T 5/002; G06T 5/20; G06T 5/50
See application file for complete search history.

(56) References Cited

U.S. PATENT DOCUMENTS

| 2018/0174318 | A1* | 6/2018 | Wang | G06T 7/62 |
| 2018/0286063 | A1* | 10/2018 | Zhou | G06T 7/521 |
| 2019/0246905 | A1* | 8/2019 | Belthangady | A61B 5/0075 |
| 2019/0269333 | A1* | 9/2019 | Bodenschatz | A61B 1/303 |
| 2020/0057831 | A1* | 2/2020 | Wu | G06T 17/00 |

* cited by examiner

*Primary Examiner* — Xin Jia
(74) *Attorney, Agent, or Firm* — Fish & Richardson P.C.

(57) ABSTRACT

The present disclosure discloses a method, a data acquisition and image processing system and a non-transitory machine-readable medium for obtaining a super-resolved image of an object. The method comprises: obtaining a plurality of structured images of the object by structured light; determining, from the structured images, modulation information of each structured light that comprises spatial frequency, phase shift and modulation factor; initializing a sample image of the object according the structured images and initializing structured pattern of each structured light by the corresponding modulation information; and restoring the image with improved resolution by adjusting the sample image and the structured pattern iteratively.

41 Claims, 6 Drawing Sheets

METHOD FOR DATA ACQUISITION AND IMAGE PROCESSING FOR RECONSTRUCTING A SUPER-RESOLVED IMAGE

TECHNICAL FIELD

Embodiments of the present disclosure relate generally to a field of fluorescent imaging. Particularly, embodiments of the disclosure relate to a method, a data acquisition and image processing system and a non-transitory machine-readable medium for obtaining a super-resolved image of an object.

BACKGROUND

In a field of imaging using structured light, a plurality of raw structured images (or referred as to modulated images), that are captured by illuminating different patterns on an object, are used to recover a super-resolved image. For example, at least 9 raw structured images are used in conventional methods. However, the more the raw structured images are used, the slower data acquisition speed of the imaging system would be. With the tendency for increasing the data acquisition speed of the imaging system, it is desired to develop a method that is capable of improving the spatial resolution for the reconstructed image with less raw structured images.

SUMMARY OF THE APPLICATION

An aspect of the present invention provides a method for obtaining a super-resolved image of an object, the method comprises: acquiring a plurality of structured images of the object by structured light; determining, from the structured images, modulation information of each structured light that comprises spatial frequency, phase shift and modulation factor; initializing a sample image of the object according the structured images and initializing structured pattern by the corresponding modulation information; and obtaining the super-resolved image by a plurality of epochs, wherein each epoch comprises:
 performing the following iteration for each structured pattern:
  determining a target image by applying the structured patterns to the sample image;
  updating frequency content of the determined target image according to difference between frequency content of the structured image and frequency content of the target image that is measurable to an imaging system used to capture the structured images;
  modifying the sample image as the super-resolved image according to difference between the target image and the target image obtained by the structured pattern adjusted in the last iteration; and
  adjusting the structured pattern by the updated target image and the modified sample image,
wherein the plurality of epochs are continued until difference between the updated sample images within two last epochs is smaller than a predetermined value.

Another aspect of the present invention provides a non-transitory machine-readable medium having instructions stored therein, which when executed by a processor, cause the processor to perform operations for acquiring a super-resolved image of an object, the operations comprising: obtaining a plurality of structured images of the object by structured light; determining, from the structured images, modulation information of each structured light that comprises spatial frequency, phase shift and modulation factor; initializing a sample image of the object according the structured images and initializing structured pattern by the corresponding modulation information; and obtaining the super-resolved image by a plurality of epochs, wherein each epoch comprises:
 performing the following iteration for each structured pattern:
  determining a target image by applying the structured patterns to the sample image;
  updating frequency content of the determined target image according to difference between frequency content of the structured image and frequency content of the target image that is measurable to an imaging system used to capture the structured images;
  modifying the sample image as the super-resolved image according to difference between the target image and the target image obtained by the structured pattern adjusted in the last iteration; and
  adjusting the structured pattern by the updated target image and the modified sample image,
wherein the plurality of epochs are continued until difference between the updated sample images within two last epochs is smaller than a predetermined value.

Yet another aspect of the present invention provides a data processing system, comprising: a processor; and a memory coupled to the processor to store instructions, which when executed by the processor, cause the processor to perform operations for obtaining a super-resolved image of an object, the operations comprising: acquiring a plurality of structured images of the object by structured light; determining, from the structured images, modulation information of each structured light that comprises spatial frequency, phase shift and modulation factor; initializing a sample image of the object according the structured images and initializing structured pattern by the corresponding modulation information; and obtaining the super-resolved image by a plurality of epochs, wherein each epoch comprises:
 performing the following iteration for each structured pattern:
  determining a target image by applying the structured pattern to the sample image;
  updating frequency content of the determined target image according to difference between frequency content of the structured image and frequency content of the target image that is measurable to an imaging system used to capture the structured images;
  modifying the sample image as the super-resolved image according to difference between the target image and the target image obtained by the structured pattern adjusted in the last iteration; and
  adjusting the structured pattern by the updated target image and the modified sample image,
wherein the plurality of epochs are continued until difference between the updated sample images within two last epochs is smaller than a predetermined value.

Yet another aspect of the present invention provides system for data acquisition and image processing, comprising a data acquisition device for acquiring a plurality of structured images of the object by structured light; a storage device for storing the plurality of structured images; and a data processing device comprising: a processor; and a memory coupled to the processor to store instructions, which when executed by the processor, cause the processor to perform operations for obtaining a super-resolved image of an object, the operations comprising:

determining, from the structured images, modulation information of each structured light that comprises spatial frequency, phase shift and modulation factor;

initializing a sample image of the object according the structured images and initializing structured pattern by the corresponding modulation information; and obtaining the super-resolved image by a plurality of epochs, wherein each epoch comprises:

performing the following iteration for each structured pattern:

determining a target image by applying the structured pattern to the sample image;

updating frequency content of the determined target image according to difference between frequency content of the structured image and frequency content of the target image that is measurable to an imaging system used to capture the structured images;

modifying the sample image as the super-resolved image according to difference between the target image and the target image obtained by the structured pattern adjusted in the last iteration; and adjusting the structured pattern by the updated target image and the modified sample image, wherein the plurality of epochs are continued until difference between the updated sample images within two last epochs is smaller than a predetermined value.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Figure 1:
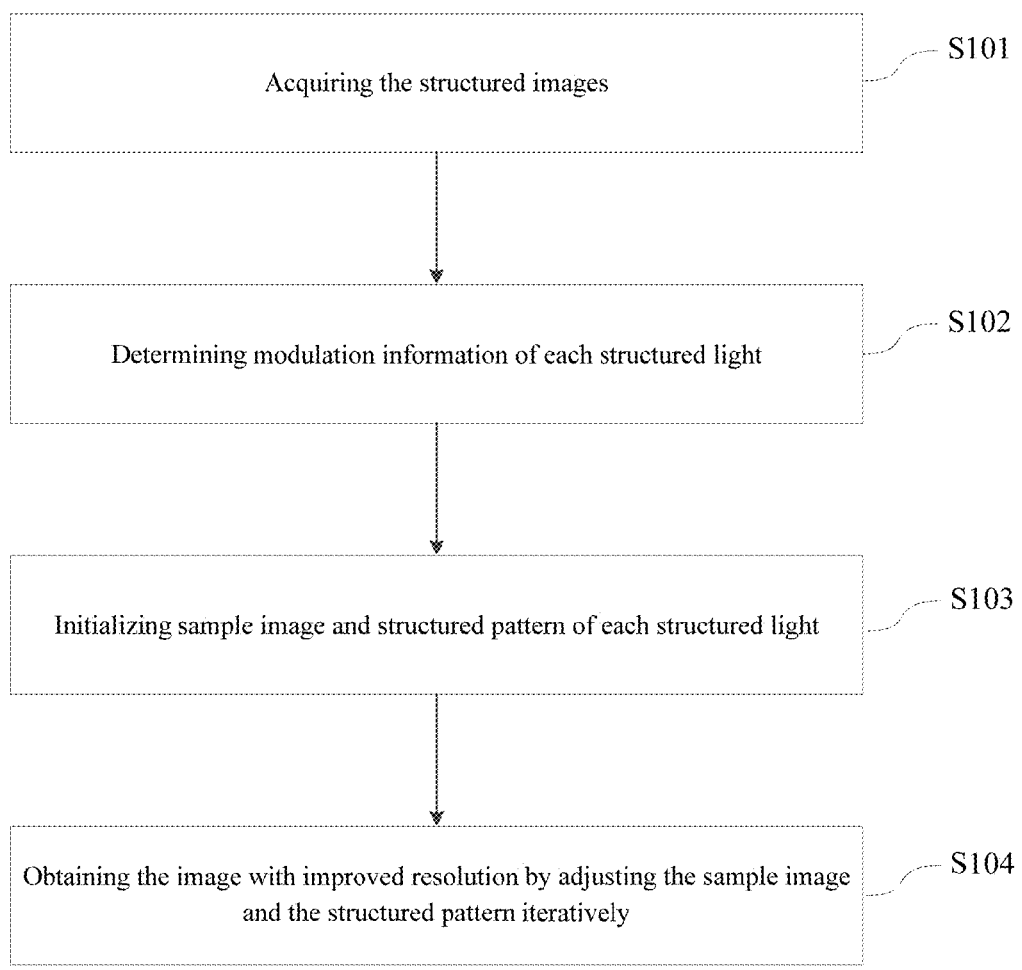
FIG. 1 shows a flowchart of the method for improving resolution of an image according to an embodiment of the present application.

FIG. 1 shows a flowchart of the method 1000 for obtaining a super-resolved image of an object according to an embodiment of the present application. The method 1000 is used to obtain a super-resolved image of an object from multiple structured light illumination modulated images (hereafter referred as to structured image) of the object. As shown in FIG. 1, the method 1000 starts with step S101 to acquire the structured images by illuminating the object with different structured light and capturing the images of the illuminated object. At S102 modulation information of each structured light used to obtain the structured images is determined from the structured images, wherein the modulation information may be used to characterize the structured light and may comprises spatial frequency, phase shift and modulation factor. Then, at step S103, a sample image and structured pattern of each structured light are initialized. Finally, at step S104, the image with improved resolution is obtained by adjusting the sample image and the structured pattern iteratively.

The above steps S102-S104 will be described more fully hereinafter with reference to FIGS. 2-4.

At step S102, the spatial frequency of the structured light may be the spatial frequency vector, and the spatial frequency may be determined by localizing the corresponding spatial frequency vector. In the following description, the spatial frequency vector of the structured light is presented as $\vec{p}_{\theta_n}$, wherein $\vec{p}_{\theta_n}$ represents the spatial frequency vector of the nth structured light. For example, $\vec{p}_{\theta_1}$, $\vec{p}_{\theta_2}$, $\vec{p}_{\theta_3}$, $\vec{p}_{\theta_4}$, and $\vec{p}_{\theta_5}$ represent the spatial frequency vectors of the first to fifth structured light, respectively.

Figure 2:
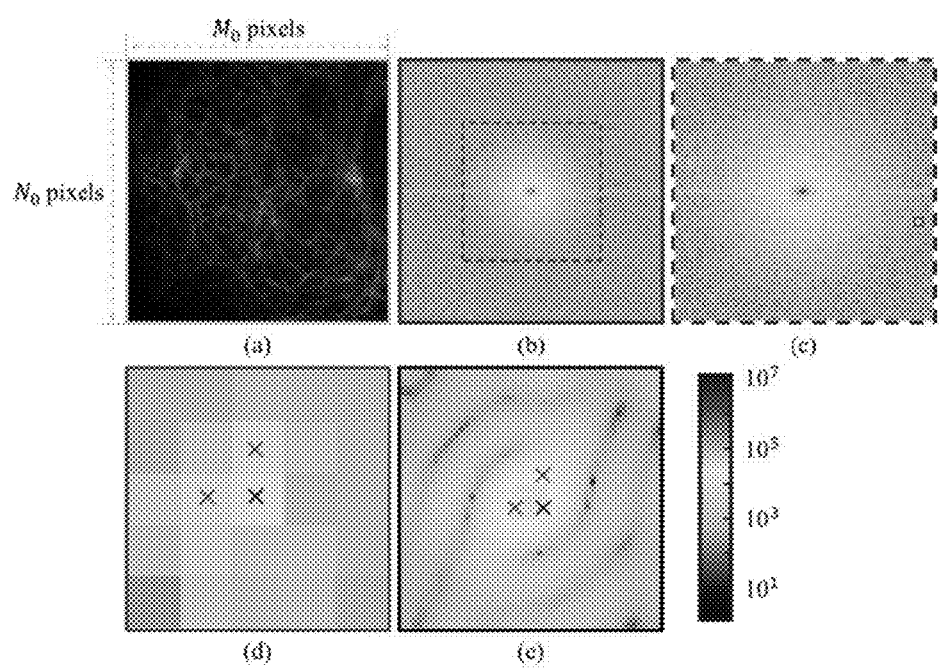
FIG. 2 shows a schematic view for illustrating the localization of the spatial frequency vector according to an embodiment of the present application.

FIG. 2 shows a schematic view for illustrating the localization of the spatial frequency vector.

In the embodiment, the spatial frequency vector $\vec{p}_{\theta_n}$ may be automatically retrieved in frequency space with subpixel precision. Specifically, the image coordinates of the peak intensity position for the frequency contents of the edge tapered raw structured image may be firstly explored by applying local maxima detection. The image coordinates may be represented as $(x_n, y_n)$, and the frequency contents of the edge tapered structured image may be represented as $\hat{D}_{edgetaper,n}'(\vec{k})$ (as shown in FIGS. 2(b) and 2(c)). The coordinates of $x_n$ and $y_n$ are integers ranged between $[1, M_0]$ and $[1, N_0]$ respectively, wherein $M_0$ and $N_0$ are the pixels number for the structured image $D_n(\vec{r})$ (as shown in FIG. 2(a)) in x direction (length dimension) and y direction (width dimension), respectively. The black cross in FIG. 2(d) represents the explored maxima. Then, the pixel precision frequency coordinates for the frequency vector may obtained according to the explored maxima, i.e., the frequency vector $\vec{p}_{\theta_n}' = (p_{u_n}', p_{v_n}')$, wherein, $$p'_{u_n} = \frac{x_n}{M_0} - \frac{1}{2}, \quad p'_{v_n} = \frac{y_n}{N_0} - \frac{1}{2},$$

$p_{u_n}'$ and $p_{v_n}'$ are the abscissa and ordinate for $\vec{p}_{\theta_n}'$, respectively. In this way, the spatial frequency vector $\vec{p}_{\theta_n}$ (i.e., $\vec{p}_{\theta_n}'$ in current embodiment) that describes the density and the direction of the structured light may be determined, and the precision thereof is equal to $$\frac{1}{M_0} \text{pixel}^{-1}, \text{ and } \frac{1}{N_0} \text{pixel}^{-1}$$

in the u and v directions, respectively.

In some embodiments, the determination of the spatial frequency vectors may further comprise an upsampling step. Specifically, the up sampling frequency content $\hat{D}_n'(\vec{k})$ (as shown in FIG. 2(3)) around the peak position, i.e., $(p_{u_n}', p_{v_n}')$ is extracted by the equation (1):

$$D_n'(\vec{k}) = \exp\left(-j \cdot \frac{2\pi}{M_0} U X^T\right) D_n(\vec{r}) \exp\left(-j \cdot \frac{2\pi}{N_0} Y V^T\right) \quad (1)$$

wherein $\vec{k} = (\hat{k}_u, \hat{k}_v)$ is the frequency space coordinate; $\hat{k}_u$ and $\hat{k}_v$ are unit vectors in the u and v directions, respectively, $X = 1, 2, \ldots, M_0$, and $Y = 1, 2, \ldots, N_0$, are the vectors that span entire image coordinates in x, and y direction, respectively, $\vec{U}$ and $\vec{V}$ are vectors that span the required sub-pixel spatial frequency locations centered at, $p_{u_n}'$, and $p_{v_n}'$, respectively, expressed as:

$$\begin{cases} \vec{U} = p_{u_n}' - \frac{w_x}{2}, p_{u_n}' - \frac{w_x}{2} + \frac{1}{\alpha}, \ldots, p_{u_n}' + \frac{w_x}{2} - \frac{2}{\alpha}, p_{u_n}' + \frac{w_x}{2} - \frac{1}{\alpha} \\ \vec{V} = p_{v_n}' - \frac{w_y}{2}, p_{v_n}' - \frac{w_y}{2} + \frac{1}{\alpha}, \ldots, p_{v_n}' + \frac{w_y}{2} - \frac{2}{\alpha}, p_{v_n}' + \frac{w_y}{2} - \frac{1}{\alpha} \end{cases} \quad (2)$$

wherein $\alpha$ is the upsampling factor, $w_x$ and $w_y$ determine the pixel length around $p_{u_n}'$, and $p_{v_n}'$, respectively.

Next, the spatial frequency vector can be determined by finding out the maximum position, i.e., $(p_{u_n}', p_{v_n}')$ in $\tilde{D}_n'(\vec{k})$ and using $(p_{u_n}', p_{v_n}')$ as the spatial frequency vector $(p_{u_n}, p_{v_n})$. As the local frequency content is upsampled around the original pixel precise frequency vector, $\vec{p}_{\theta_n} = p_{u_n} \hat{k}_u + p_{v_n} \hat{k}_v$, the step size in $\tilde{D}_n'(\vec{k})$ is minimized to $$\frac{1}{\alpha M_0} \text{pixel}^{-1}, \text{ and } \frac{1}{\alpha N_0} \text{pixel}^{-1},$$

from $$\frac{1}{M_0} \text{pixel}^{-1}, \text{ and } \frac{1}{N_0} \text{pixel}^{-1},$$

in the u and v directions, respectively. Therefore, the peak frequency vector localization precision is improved with a factor of $\alpha$, that is, the precision of spatial frequency vector is improved with a factor of $\alpha$.

The phase shift of each structured light may be obtained by: constructing a structured pattern for each structured light by an initialized phase shift and the corresponding spatial frequency; and adjusting each initialized phase shift by minimizing difference between the structured pattern for each structured light and the corresponding structured images.

As an example, a structured pattern of the nth structure light may be constructed according to the localized subpixel precise frequency vector $\vec{p}_{\theta_n}$. For example, the structured pattern $T_n(\vec{r}) = \cos(2\pi \vec{p}_{\theta_n} \cdot \vec{r} + \varphi_{n,ini})$, wherein $\varphi_{n,ini}$ is an initial value for the phase shift $\varphi_n$. The values for $\varphi_{n,ini}$ can be, but not limited to, 0, $\pi/4$, $\pi/3$, $\pi/2$, $2\pi/3$, and, $3\pi/4$, etc. The correlation between the structured pattern and the nth structured image $D_n(\vec{r})$ may be expressed as:

$$C_n = \sum_{\vec{r}} T_n(\vec{r}) D_n(\vec{r}), \quad (3)$$

where $C_n$ represents the correlation, and $$\sum_{\vec{r}}$$

describes the summation carried over the entire range of the spatial coordinates r. The difference between the structured pattern $T_n(\vec{r})$ and the nth structured image $D_n(\vec{r})$ may be minimized by iteratively optimizing the parameter until the correlation $C_n$ reaches a minimum. When the correlation $C_n$ reaches the minimum, the initial value $\varphi_{n,ini}$ is optimized to be $\varphi_{n,opt}'$ that may be used as the phase shift of the nth structured light. It should be noted that there exists a bias of $\pi$ between the $\varphi_{n,opt}'$ and $\varphi_n$. To ensure the $\varphi_n$ that is ranged between 0 to $2\pi$, the $\varphi_n$ and $\varphi_{n,opt}'$ is limited to have a relation: $\varphi_n = (\varphi_{n,opt}' - \pi) \mod 2\pi$, where mod represents the modulo operation.

The modulation factor of each structured light may be obtained from the raw structured image, $D_n(\vec{r})$, by analyzing the power spectrum for the duplex sideband frequencies in the background rejected frequency contents.

Figure 3:
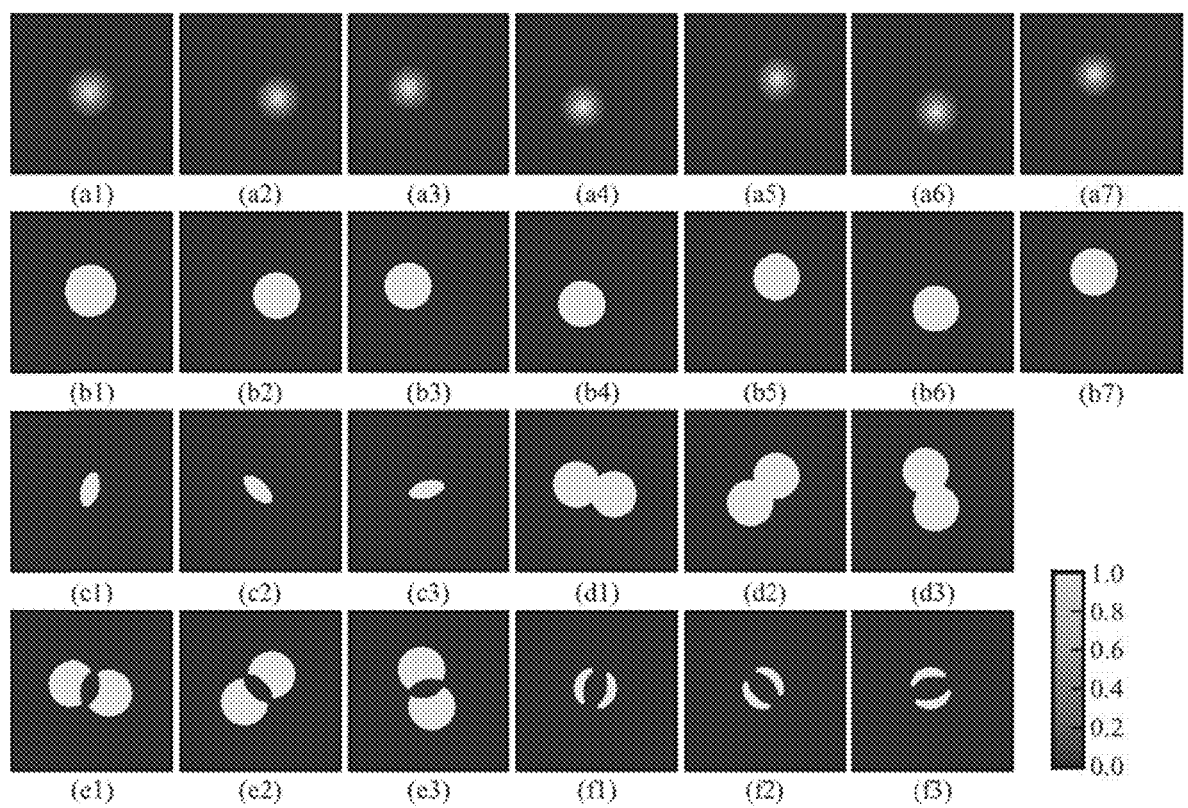
FIG. 3 shows a schematic view for illustrating the identification of the regions for the duplex sideband frequencies according to an embodiment of the present application.

The effective regions for the duplex sideband frequencies may be firstly identified according to the optical transfer function (OTF) $\tilde{H}(\vec{k})$ of the imaging system (shown in FIG. 3($a$1)) and the localized frequency vectors $\vec{p}_{\theta_n}$ of the structured light.

To this end, the OTF may be firstly binarized to approximately determine the regions inside the OTF support from $\tilde{H}(\vec{k})$. The binarization may be expressed as:

$$L0 = \begin{cases} 1 & \tilde{H}(\vec{k}) \geq \varepsilon_0 \\ 0 & \tilde{H}(\vec{k}) < \varepsilon_0 \end{cases}, \quad (4)$$

where L0 is a binary tag image (shown in FIG. 3($b$1)), and $\varepsilon_0$ is a manually set gray threshold. The pixels in L0 are classified as inside the OTF support and labelled by "1", when the normalized grayscale intensities are greater than or equal to the gray threshold $\varepsilon_0$, while classified as out of the OTF support and labelled by "0", in the opposite cases. In some embodiments, the size of $\tilde{H}(\vec{k})$ may be doubled by filling the zero in the exterior pixels.

Next, the OTF may be shifted with the spatial frequency vectors that having different frequencies. For example, the first, fourth and fifth structured light has different frequencies, and the frequency vectors thereof, i.e., $\vec{p}_{\theta_1}$, $\vec{p}_{\theta_4}$, and $\vec{p}_{\theta_5}$ may be used to shift the OTF. In this embodiment, the shifted OTF may be represented as: $\tilde{H}(\vec{k}-\vec{p}_{\theta_1})$, $\tilde{H}(\vec{k}+\vec{p}_{\theta_1})$, $\tilde{H}(\vec{k}-\vec{p}_{\theta_4})$, $\tilde{H}(\vec{k}+\vec{p}_{\theta_4})$, $\tilde{H}(\vec{k}-\vec{p}_{\theta_5})$ and $\tilde{H}(k-\vec{p}_{\theta_5})$, as shown in FIG. 3 (a2)-(a7). The shift biases are round$\{\vec{p}_{u_n}M_0\}$, and round$\{\vec{p}_{v_n}N_0\}$, n=1, 4, or 5, in length and width dimensions, respectively, where round$\{\cdot\}$ represents the rounding operation. In some embodiments, matrix circular shift operation is employed to obtain the shifted OTFs here.

Then the regions inside the shifted OTFs support, i.e., $$L1_{+\vec{p}_{\theta_n}} \text{ or } L1_{-\vec{p}_{\theta_n}},$$

may be determined by the equation:

$$L1_{+\vec{p}_{\theta_n}} \text{ or } L1_{-\vec{p}_{\theta_n}} = \begin{cases} 1 & \tilde{H}(\vec{k}-\vec{p}_{\theta_n}) \geq \varepsilon_0 \text{ or } \tilde{H}(\vec{k}-\vec{p}_{\theta_n}) \geq \varepsilon_0 \\ 0 & \tilde{H}(\vec{k}-\vec{p}_{\theta_n}) < \varepsilon_0 \text{ or } \tilde{H}(\vec{k}-\vec{p}_{\theta_n}) < \varepsilon_0 \end{cases}, \quad (5)$$

The pixels in $$L1_{+\vec{p}_{\theta_n}} \text{ or } L1_{-\vec{p}_{\theta_n}}$$

are classified as inside the shifted OTFs support and labelled by "1", when the normalized grayscale intensities are greater than or equal to the gray threshold $\varepsilon_0$; otherwise, the pixels are classified as out of the shifted OTFs support and labelled by "0". FIGS. 3 (b2)-(b7) present the binary tag images of $$L1_{+\vec{p}_{\theta_1}}, L1_{-\vec{p}_{\theta_1}}, L1_{+\vec{p}_{\theta_4}}, L1_{-\vec{p}_{\theta_4}}, L1_{+\vec{p}_{\theta_5}}, \text{ and } L1_{-\vec{p}_{\theta_5}},$$

respectively.
The dilated intersection regions between $$L1_{+\vec{p}_{\theta_n}} \text{ and } L1_{-\vec{p}_{\theta_n}}$$

may be expressed as:

$$L2_{\vec{p}_{\theta_n}} = \left( L1_{+\vec{p}_{\theta_n}} \cap L1_{-\vec{p}_{\theta_n}} \right) \oplus SE_1, \quad (6)$$

wherein $$L2_{\vec{p}_{\theta_n}}$$

is a binary tag image, "∩" is the intersection operator, "⊕" is the dilation operator, and $SE_1$ is a disk structure element object (e.g., a 20 pixels disk structure element object). The morphological dilation operation is applied to enlarge the intersection regions, the pixels in which are both inside the shifted OTF support of $\tilde{H}(\vec{k}+\vec{p}_{\theta_n})$, and $\tilde{H}(\vec{k}-\vec{p}_{\theta_n})$. FIGS. 3 (c1)-(c3) present the binary tag images of $$L2_{\vec{p}_{\theta_1}}, L2_{\vec{p}_{\theta_4}}, \text{ and } L2_{\vec{p}_{\theta_5}},$$

respectively.
The aggregated regions of $$L1_{+\vec{p}_{\theta_n}} \text{ and } L1_{-\vec{p}_{\theta_n}}$$

may be expressed as:

$$L3_{\vec{p}_{\theta_n}} = L1_{+\vec{p}_{\theta_n}} \cup L1_{-\vec{p}_{\theta_n}}, \quad (7)$$

wherein $$L3_{\vec{p}_{\theta_n}}$$

is a binary tag image, and "∪" is the union operator. The pixels in $$L3_{\vec{p}_{\theta_n}}$$

are labelled by "1", when they are either inside the shifted OTF support of $\tilde{H}(\vec{k}+\vec{p}_{\theta_n})$, and $\tilde{H}(\vec{k}-\vec{p}_{\theta_n})$. FIGS. 3(d1)-(d3) present the binary tag images of $$L3_{\vec{p}_{\theta_1}}, L3_{+\vec{p}_{\theta_4}}, \text{ and } L3_{\vec{p}_{\theta_5}},$$

respectively.
The set difference of $$L3_{\vec{p}_{\theta_n}} \text{ and } L2_{\vec{p}_{\theta_n}}$$

may be expressed as:

$$L4_{\vec{p}_{\theta_n}} = L3_{\vec{p}_{\theta_n}} - L2_{\vec{p}_{\theta_n}}, \quad (8)$$

wherein $$L4_{\vec{p}_{\theta_n}}$$

is the result of set difference, and "−" is the set difference operator. The pixels in $$L4_{\vec{p}_{\theta_n}}$$

are labelled by "1", when they are labelled by "1" in $$L3_{\vec{p}_{\theta_n}},$$

while not labelled by "1" in $$L2_{\vec{p}_{\theta_n}}.$$

FIGS. 3(e1)-(e3) present the binary tag images of $$L4_{\vec{p}_{\theta_1}}, L4_{\vec{p}_{\theta_4}} \text{ and } L4_{\vec{p}_{\theta_5}},$$

respectively.

Since only the spatial frequencies within the OTF support can pass through the imaging system, the regions for the duplex sideband frequencies can be approximately determined by multiply $$L4_{\vec{p}_{\theta_n}}$$

with L0, i.e., the follow equation:

$$L5_{\vec{p}_{\theta_n}} = (L4_{\vec{p}_{\theta_n}} \cdot L0) \ominus SE_2, \tag{9}$$

wherein $$L5_{\vec{p}_{\theta_n}}$$

is a Dimly Lag image, L0 is given by Eq. (4), "$\ominus$" is the erosion operator, and $SE_2$ is a disk structure element object (e.g., a 10 pixels disk structure element object). The morphological erosion operation is applied to diminish the interruption of the zero-order frequency contents. The pixels in $$L5_{\vec{p}_{\theta_n}}$$

are labelled by "1", are classified as the regions for the duplex sideband frequencies. FIGS. 3(f1)-(f3) present the binary tag images of $$L5_{\vec{p}_{\theta_1}}, L5_{\vec{p}_{\theta_4}}, \text{ and } L5_{\vec{p}_{\theta_5}},$$

respectively.

The $$L5_{\vec{p}_{\theta_n}}$$

may represent transfer property of the imaging system for nth structured light.

To determine the duplex sideband frequency contents, frequency contents for the widefield image, i.e., $\tilde{D}_w(\vec{k})$ may be firstly determined from the frequency contents of the raw structured images with identical illumination frequency vector. In the embodiment, the first to third structured images are the structured images with identical illumination frequency vector. The frequency contents for the widefield image may be expressed as:

$$\tilde{D}_w(\vec{k}) = \frac{1}{3}[\tilde{D}_1(\vec{k}) + \tilde{D}_2(\vec{k}) + \tilde{D}_3(\vec{k})] \tag{10}$$

$$= \frac{1}{3}[F^{-1}\{D_1(\vec{r})\} + F^{-1}\{D_2(\vec{r})\} + F^{-1}\{D_3(\vec{r})\}]$$

$$= \tilde{f}(\vec{k}) + \tilde{D}_{p_2}(\vec{k}) + \frac{1}{3}\sum_{t=1}^{3}\tilde{N}_t(\vec{k})$$

where $\mathcal{F}\{\cdot\}$ represents the Fourier transform, $\tilde{D}_{p_2}(\vec{k})$ represents the out-of-focus frequency components, $\tilde{N}_t(\vec{k})$, t=1, 2, 3, represents the noise frequency components, and $\tilde{f}(\vec{k})$ represents the detectable in-focus frequency components, given by: $\tilde{f}(\vec{k})=I_0\tilde{S}(\vec{k})\tilde{H}(\vec{k})$. $\tilde{D}_1(\vec{k})$, and $\tilde{D}_w(\vec{k})$ are shown in FIGS. 4 (a1) and (b1), respectively. The magnification of their central part, indicated by the dashed bounding boxes, are shown in FIGS. 4(a2) and (b2), respectively. The noise frequencies in $\tilde{N}_t(\vec{k})$, t=1, 2, 3, are uncorrelated, as for their stochastic characteristics.

Figure 4:
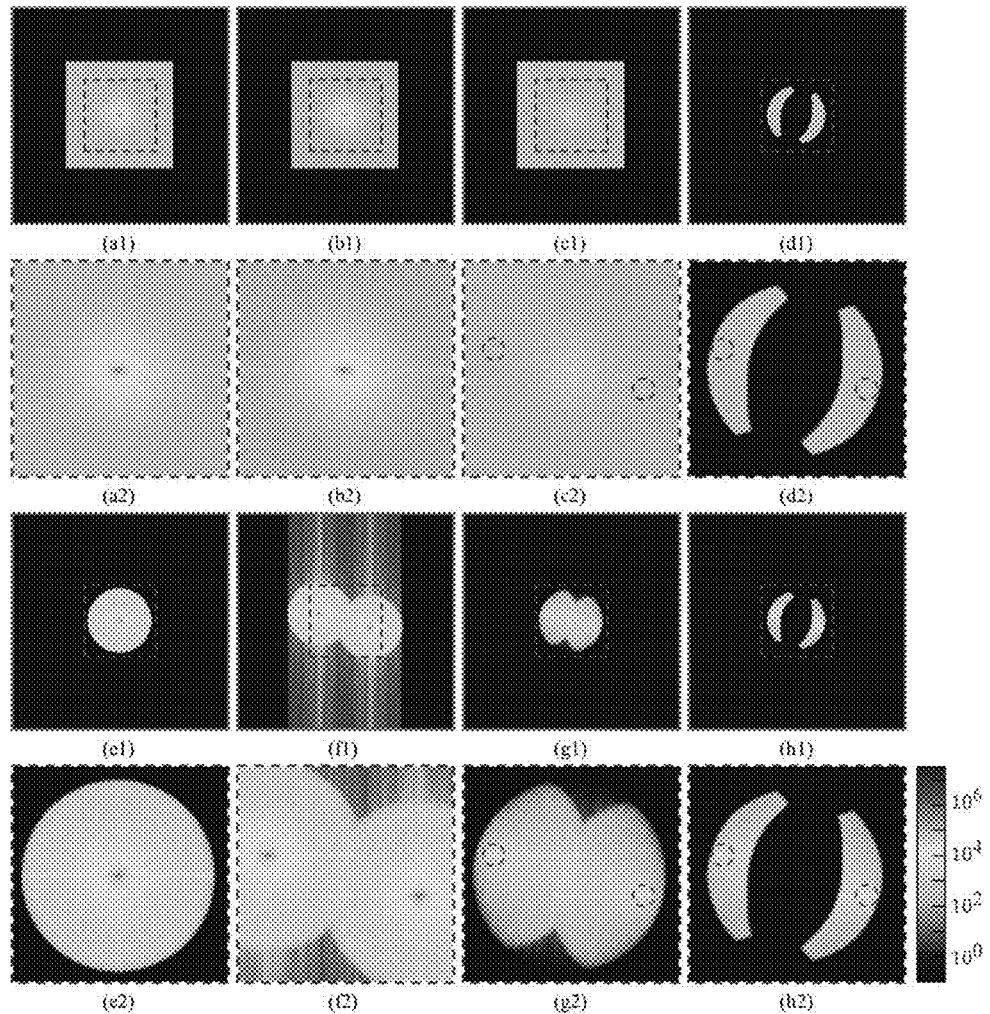
FIG. 4 shows a schematic view for illustrating the extraction of duplex sideband frequency contents according to an embodiment of the present application.

The unwanted out-of-focus frequency components may be removed by subtracting $\tilde{D}_w(\vec{k})$ from $\tilde{D}_n(\vec{k})$. The result of the subtraction is the duplex sideband frequency contents, i.e., $\tilde{W}_{\vec{p}_{\theta_n}}(\vec{k})$, that is expressed as:

$$\tilde{W}_{\vec{p}_{\theta_n}}(\vec{k}) = \tag{11}$$

$$\tilde{D}_n(\vec{k}) - \tilde{D}_w(\vec{k}) = \frac{m_n}{2}[\exp(j\varphi_n)\tilde{f}(\vec{k} - \vec{p}_{\theta_n}) + \exp(-j\varphi_n)\tilde{f}(\vec{k} - \vec{p}_{\theta_n})] +$$

$$\tilde{N}_n(\vec{k}) - \frac{1}{3}\sum_{t=1}^{3}\tilde{N}_t(\vec{k}),$$

where $\tilde{f}(\vec{k}-\vec{p}_{\theta_n})$, and $\tilde{f}(\vec{k}+\vec{p}_{\theta_n})$ are the sideband frequency components, centered at $\vec{p}_{\theta_n}$ and $-\vec{p}_{\theta_n}$, respectively, given by:

$$\begin{cases} \tilde{f}(\vec{k}-\vec{p}_{\theta_n}) = I_0 \tilde{S}(\vec{k}-\vec{p}_{\theta_n})\tilde{H}(\vec{k}) \\ \tilde{f}(\vec{k}+\vec{p}_{\theta_n}) = I_0 \tilde{S}(\vec{k}+\vec{p}_{\theta_n})\tilde{H}(\vec{k}) \end{cases} \quad (12)$$

where $I_0$ is the intensity distribution of the illumination light.

$$\tilde{W}_{\vec{p}_{\theta_n}}(\vec{k})$$

is shown in FIG. 4(c1); the magnification of its central part, indicated by the dashed bounding box, is shown in FIG. 4(c2).

Then, effective duplex sideband frequency contents (i.e., first frequency content) may be extracted, according to transfer property of the imaging system for each structured light, from the duplex sideband frequency contents (i.e., second frequency content) of each structured image. Specifically, The effective duplex sideband frequency contents, represented as $$\tilde{W}'_{\vec{p}_{\theta_n}}(\vec{k}),$$

can be extracted from $$\tilde{W}_{\vec{p}_{\theta_n}}(\vec{k}),$$

by multiplying $$L5_{\vec{p}_{\theta_n}},$$

as:

$$\tilde{W}'_{\vec{p}_{\theta_n}}(\vec{k}) = \tilde{W}_{\vec{p}_{\theta_n}}(\vec{k}) \cdot L5_{\vec{p}_{\theta_n}}, \quad (13)$$

FIG. 4(d1) presents the extracted $$\tilde{W}'_{\vec{p}_{\theta_n}}(\vec{k});$$

the magnification of its central part, indicated by the red dashed bounding box, is shown in FIG. 4(d2).

Next, effective target duplex shifted frequency contents (i.e., third frequency content) of the structured images may extracted based on power spectra of the widefield image.

Specifically, since both signals and noises contribute to power spectrum, the power spectra of the widefield image, i.e., $\xi_w$, can be expressed as:

$$\xi_w = \xi_{w,sig} + M_0 N_0 \cdot \xi_{w,N}, \quad (14)$$

wherein $M_0$ and $N_0$ are the image pixels in length and width dimensions, respectively; and represents the average noise power. The $\xi_{w,N}$ may be initialized by averaging the power spectra with the frequencies that are greater than a predetermined frequency (e.g., 1.25 times cut-off frequency, i.e. |$\vec{k}$|>1.25 $k_{cut}$), as:

$$\xi_{w,N} = \frac{1}{M_0 N_0 - A_0} \sum_{\vec{k}} [\tilde{D}_w(\vec{k}) \cdot \text{conj}\{\tilde{D}_w(\vec{k})\}] \cdot \text{Mask}(\vec{k}), \quad (15)$$

where conj(·) represents the complex conjugate, Mask($\vec{k}$) is a 2D binary mask, given by:

$$\text{Mask}(\vec{k}) = \begin{cases} 1 & |\vec{k}| \geq 1.25 k_{cut} \\ 0 & |\vec{k}| < 1.25 k_{cut} \end{cases}, \quad (16)$$

and $A_0$ represents the image area of the frequencies that are smaller than the predetermined frequency, a.k.a., the total pixels of Mask($\vec{k}$) with zero intensity value. The signal power may be zero in the regions outside of the OTF support.

The widefield image signal power spectra, i.e., $\xi_{w,sig}$, may be given by:

$$\xi_{w,sig} = \sum_{\vec{k}} \tilde{D}_w(\vec{k}) \cdot \text{conj}\{\tilde{D}_w(\vec{k})\} - \frac{M_0 N_0}{M_0 N_0 - A_0} \sum_{\vec{k}} \tilde{D}_w(\vec{k}) \text{conj}\{\tilde{D}_w(\vec{k})\} \cdot \text{Mask}(\vec{k}) \quad (17)$$

An approximation of the signal power spectra may be given by:

$$\xi'_{w,sig} = \sum_{\vec{k}} \lambda_w^2 [\tilde{H}(\vec{k}) \cdot \text{conj}\{\tilde{H}(\vec{k})\}] \|\vec{k}\|_2^{-2\gamma} \quad (18)$$

where $\lambda_w$ and $\gamma_w$ are scale factors, $\tilde{H}(\vec{k})$ is the system OTF, and $$\sum_{\vec{k}}$$

describes the summation carried over the entire range of frequency coordinates, $\vec{k}$.

The difference between the $\xi_{w,sig}$ and $\xi_{w,sig}'$ may be represented by mean-square-error (MSE) thereof. The MSE may be given by:

$$MSE_{\xi_{w,sig}} = \left\{ \sum_{\vec{k}} \{\tilde{D}_w(\vec{k}) \cdot \text{conj}\{\tilde{D}_w(\vec{k})\}\} - M_0 N_0 \xi_{w,N} - \lambda_w^2 \tilde{H}(\vec{k}) \cdot \text{conj}\{\tilde{H}(\vec{k})\} \|\vec{k}\|_2^{-2\gamma_w} \right\}^2 \quad (19)$$

Gradient descent algorithm may be applied to minimize the $MSE_{\xi_{w,sig}}$, by iteratively optimizing the parameters, i.e., $\lambda_w$ and $\gamma_w$, from $\lambda_{w,ini}$ and $\gamma_{w,ini}$, to $\lambda_{w,opt}$ and $\gamma_{w,opt}$. Such iterative optimization may be ended when $MSE_{\tilde{\xi}_{w,sig}}$ reach to its minima.

Next, the low-grade estimated emission frequency contents, represented as $\tilde{S}_o(\vec{k})$, may be achieved by suppressing the noise outside of the OTF support for $\tilde{D}_w(\vec{k})$, expressed as:

$$\tilde{S}_o(\vec{k}) = \frac{\text{conj}\{\tilde{H}(\vec{k})\}}{\tilde{H}(\vec{k}) \cdot \text{conj}\{\tilde{H}(\vec{k})\} + \frac{\xi_{w,N}}{\lambda_{w,opt}^2}\|\vec{k}\|^{-2\gamma_{w,opt}}} \tilde{D}_w(\vec{k}) \quad (20)$$

$\tilde{S}_o(\vec{k})$ is shown in FIG. 4(e1); the magnification of its central part, indicated by the red dashed bounding box, is shown in FIG. 4 (e2).

Then the low-grade estimated emission frequency contents may be shifted with the frequency vectors, so as to determine the duplex shifted frequency contents $$\tilde{S}_{\vec{p}_{\theta_n}}(\vec{k}).$$

The $$\tilde{S}_{\vec{p}_{\theta_n}}(\vec{k})$$

may be expressed as:

$$\tilde{S}_{\vec{p}_{\theta_n}}(\vec{k}) = \quad (21)$$
$$F\{F^{-1}\{\tilde{S}_o(\vec{k})\} \cdot \{\exp[-j \cdot (2\pi\vec{p}_{\theta_n} \cdot \vec{r} + \varphi_n)] + \exp[j \cdot (2\pi\vec{p}_{\theta_n} \cdot \vec{r} + \varphi_n)]\}\}$$

where $\mathcal{F}\{\cdot\}$ and $\mathcal{F}^{-1}\{\cdot\}$ represent the Fourier transform and inverse Fourier transform, respectively, j is the imaginary unit, $\vec{p}_{\theta_n}$ is the $n^{th}$ frequency vectors, $\varphi_n$ is the $n^{th}$ determined phase shift.

$$\tilde{S}_{\vec{p}_{\theta_n}}(\vec{k})$$

is shown in FIG. 4 (f1); the magnification of its central part, indicated by the red dashed bounding box, is shown in FIG. 4 (f2).

After determining the duplex shifted frequency contents, the target duplex shifted frequency contents (i.e., the fourth frequency content) may be determined by filtering the shifted low-grade estimated emission frequency content according to the transfer property of the imaging system for the corresponding structured light. Specifically, the target duplex shifted frequency contents $$\tilde{Z}_{\vec{p}_{\theta_n}}(\vec{k})$$

may be determined by the relation:

$$\tilde{Z}_{\vec{p}_{\theta_n}}(\vec{k}) = \tilde{S}_{\vec{p}_{\theta_n}}(\vec{k}) \cdot H(\vec{k}) \quad (22)$$
$$= F\{F^{-1}\{\tilde{S}_o(\vec{k})\} \cdot \{\exp[-j \cdot (2\pi\vec{p}_{\theta_n} \cdot \vec{r} + \varphi_n)] +$$
$$\exp[j \cdot (2\pi\vec{p}_{\theta_n} \cdot \vec{r} + \varphi_n)]\}\} \cdot \tilde{H}(\vec{k})\tilde{Z}_{\vec{p}_{\theta_n}}(\vec{k})$$

is shown in FIG. 4(g1); the magnification of its central part, indicated by the red dashed box, is shown in FIG. 4(g2).

Next, the effective target duplex shifted frequency contents may be extracted, according to the transfer property of the imaging system, from the target duplex shifted frequency contents. The effective target duplex shifted frequency contents may be represented as $$\tilde{Z}'_{\vec{p}_{\theta_n}}(\vec{k}),$$

and be determined by the equation:

$$\tilde{Z}'_{\vec{p}_{\theta_n}}(\vec{k}) = \tilde{Z}_{\vec{p}_{\theta_n}}(\vec{k}) \cdot L5_{\vec{p}_{\theta_n}} \quad (23)$$

FIG. 4 (h1) presents the extracted $$\tilde{Z}'_{\vec{p}_{\theta_n}}(\vec{k});$$

and the magnification of its central part, indicated by the dashed bounding box, is shown in FIG. 4 (h2).

Finally, the modulation factor for each structured light may be determined based on the above mentioned first and third frequency contents of each structured image. For example, the modulation factor may be represented as $m_n$ and obtained by the equation:

$$m_n = \frac{\left\|\sum_{\vec{k}}[\tilde{Z}'_{\vec{p}_{\theta_n}}(\vec{k}) \cdot \text{conj}\{\tilde{W}'_{\vec{p}_{\theta_n}}(\vec{k})\} + \text{conj}\{\tilde{Z}'_{\vec{p}_{\theta_n}}(\vec{k})\} \cdot \tilde{W}'_{\vec{p}_{\theta_n}}(\vec{k})]\right\|_2}{\sum_{\vec{k}}\tilde{Z}'_{\vec{p}_{\theta_n}}(\vec{k}) \cdot \text{conj}\{\tilde{Z}'_{\vec{p}_{\theta_n}}(\vec{k})\}} \quad (24)$$

wherein $$\sum_{\vec{k}}$$

describes the summation carried over the entire range of frequency coordinates, $\vec{k}$, and $\|\cdot\|_2$ is L2-norm operator. It should be noted that $$\left\|\sum_{\vec{k}}[\tilde{Z}'_{\vec{p}_{\theta_n}}(\vec{k}) \cdot \text{conj}\{\tilde{W}'_{\vec{p}_{\theta_n}}(\vec{k})\} + \text{conj}\{\tilde{Z}'_{\vec{p}_{\theta_n}}(\vec{k})\} \cdot \tilde{W}'_{\vec{p}_{\theta_n}}(\vec{k})]\right\|_2$$

in Eq. (24) is a positive real number, as $$\sum_{\vec{k}} [\tilde{Z}'_{\vec{p}_{\theta_n}}(\vec{k}) \cdot \text{conj}\{\tilde{W}'_{\vec{p}_{\theta_n}}(\vec{k})\} + \text{conj}\{\tilde{Z}'_{\vec{p}_{\theta_n}}(\vec{k})\} \cdot \tilde{W}'_{\vec{p}_{\theta_n}}(\vec{k})]$$

is a complex number.

After determined the modulation information (i.e., spatial frequency, phase shift and modulation factor) of each structured light, the structured pattern of each structured light may be initialized as:

$$P_n^{(0)}(\vec{r}) = \frac{1 + \frac{m_n^2}{2} + 2m\cos(2\pi\vec{p}_{\theta_n} \cdot \vec{r} + \varphi_n) + \frac{m_n^2}{2}\cos[2(2\pi\vec{p}_{\theta_n} \cdot \vec{r} + \varphi_n)]}{(1 + m_n)^2} \quad (25)$$

wherein $\vec{p}_{\theta_n}$ is the localized subpixel precision frequency vector, $\varphi_n$ is the determined phase shift, and $m_n$ is the explored modulation factor.

In addition, a sample image used to obtain the super-resolved image may be initialized based on the low-grade emission frequency contents. Specifically, the initialized sample image may be determined by applying the inverse Fourier transform of the low-grade emission frequency contents, i.e., $S^{(0)}(\vec{r}) = \mathcal{F}^{-1}\{\tilde{S}_o(\vec{k})\}$, wherein $S^{(0)}(\vec{r})$ represents initialized sample image.

To rebuild the fine structure based on the initialized sample image, an iterative optimizing process may be performed. During the iterative optimization process, the sample image is updated for each structured light until difference between the updated sample images within two last iterations is smaller than a predetermined value. The iterative optimizing process may comprise a plurality of epochs, and each of the epochs is a loop. In other words, the iterative optimizing process may comprise a plurality of loops, in each of which all the structured patterns may be adjusted in an iterative manner (e.g. in each epoch, an iteration is performed for each structured pattern).

The detailed iterative optimizing process will be described according FIG. 5.

Figure 5:
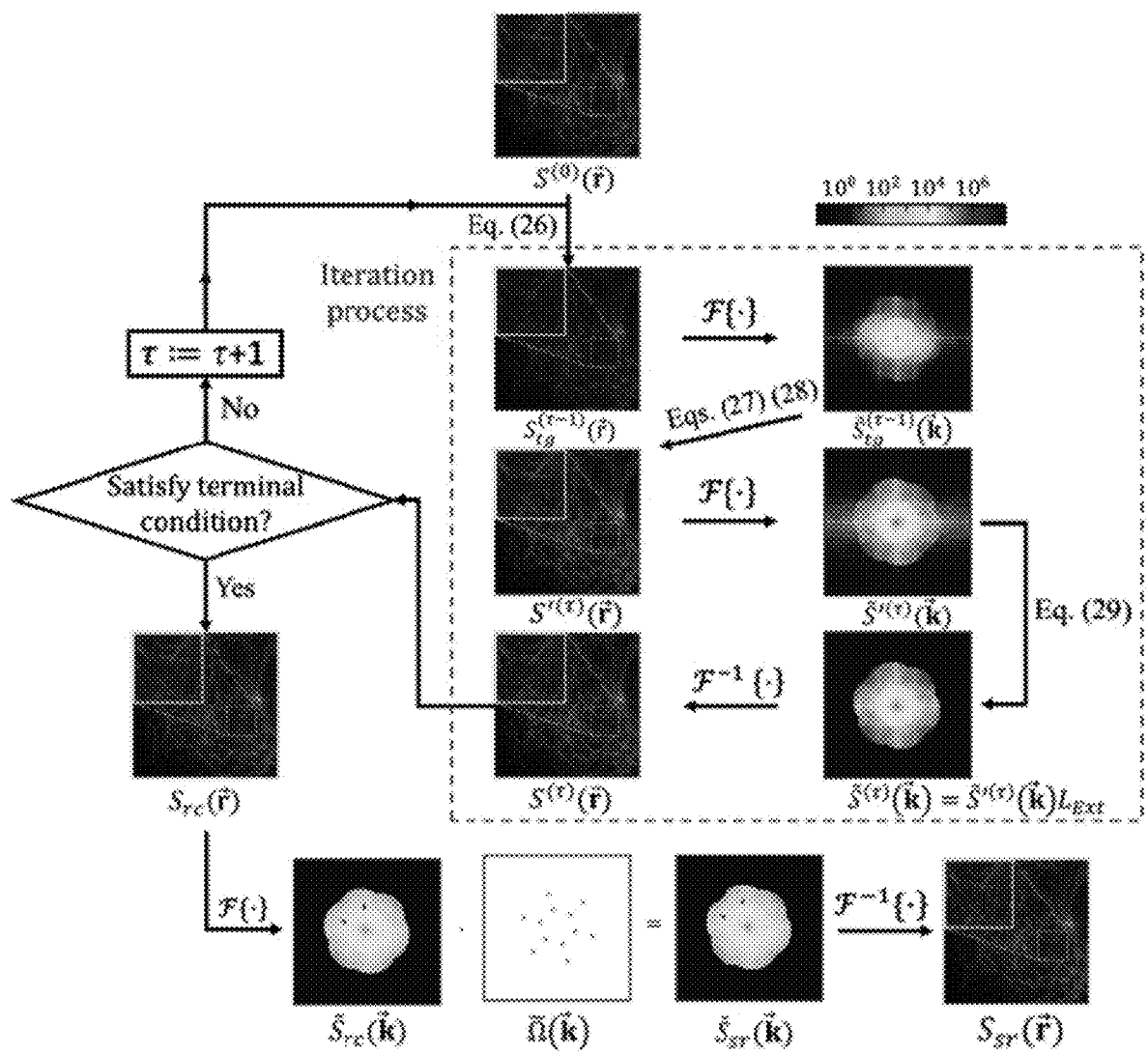
FIG. 5 shows a flowchart of the iterative optimizing process according to an embodiment of the present application.

As shown in FIG. 5, in $\tau^{th}$ iteration, a target image, i.e., $S_{tg}^{(\tau-1)}(\vec{r})$, may be constructed by multiply the sample image, i.e., $S^{(\tau)}(\vec{r})$, with the structured pattern, as:

$$S_{tg}^{(\tau-1)} = S^{(\tau-1)}(\vec{r})P_n^{(\tau_{epc})}(\vec{r}) \quad (26)$$

where $S^{(\tau-1)}(\vec{r})$ is the sample image, $P_n^{(\tau_{epc})}(\vec{r})$ is the $n^{th}$ structured pattern, n is the sequential order number, related to the iteration order number, as: n=[($\tau$−1) mod 5]+1, $\tau_{epc}$ is the epoch order number, related to the iteration order number, as: $\tau_{epc}\lfloor\tau/5\rfloor$, $\lfloor\cdot\rfloor$ is the round down operator. It should be noted, although 5 kinds of structured light are used in the embodiment, the present application is not limited thereto. In addition, when the superscript of $\tau$−1 or $\tau_{epc}$ in the parentheses in Eq. (26) is equal to 0, the initial value of the associated term is used. For example, the initial target image is given by: $S_{tg}^{(0)}(\vec{r}) = S^{(0)}(\vec{r})P_1^{(0)}(\vec{r})$, wherein $S^{(0)}(\vec{r})$ is the initial guess of the sample image, and $P_1^{(0)}(\vec{r})$ is the initial structured pattern, determined by Eq. (25). The frequency content of the initial target image is given by: $\tilde{S}_{tg}^{(0)}(\vec{k}) = \mathcal{F}\{S_{tg}^{(0)}(\vec{r})\}$.

Next, frequency content of the determined target image may be updated according to difference between frequency content of the structured image and frequency content of the target image that is measurable to a sample system used to capture the structured images. Specifically, frequency content of the target image may be updated by calculating the frequencies differential that is expressed as:

$$\tilde{S}_{tg}^{(\tau)}(\vec{k}) := \tilde{S}_{tg}^{(\tau-1)}(\vec{k}) + \tilde{H}^{(\tau-1)}(\vec{k}) \cdot \{F\{D_n(\vec{r})\} - \tilde{H}^{(\tau-1)}(\vec{k}) \cdot \tilde{S}_{tg}^{(\tau-1)}(\vec{k})\} \quad (27)$$

where $\tilde{S}_{tg}^{(\tau)}(\vec{k})$ is the updated frequency contents, := is the updating operator, $\tilde{S}_{tg}^{(\tau-1)}(\vec{k})$ is the Fourier transform of $S_{tg}^{(\tau-1)}(\vec{r})$, i.e., $\tilde{S}_{tg}^{(\tau-1)}(\vec{k}) = \mathcal{F}\{S_{tg}^{(\tau-1)}(\vec{r})\}$, $\mathcal{F}\{\cdot\}$ represents the Fourier transform, $D_n(\vec{r})$ is the $n^{th}$ raw structured image, $\tilde{H}^{(\tau-1)}(\vec{k})$ is the system OTF, and $\tau$ describes the iteration order number. When the superscript of $\tau$−1 in the parentheses in Eq. (27) is equal to 0, the initial value of the associated term is used. After obtaining the updated frequency contents, the updated target image may be determined by: $S_{tg}^{(\tau)}(\vec{r}) = \mathcal{F}^{-1}\{\tilde{S}_{tg}^{(\tau)}(\vec{k})\}$.

Then, the sample image is modified according to difference between the target image and the target image obtained by the structured pattern adjusted in the last iteration. At this step, the fine structure in the sample may be recovered as number of the iteration increasing. The sample image may be updated by calculating the image differential. The updated sample image in $\tau^{th}$ iteration may be represented as $S'^{(\tau)}(\vec{r})$, and the $S'^{(\tau)}(\vec{r})$ may be determined by the equation:

$$S'^{(\tau)}(\vec{r}) := S^{(\tau-1)}(\vec{r}) + \frac{P_n^{(\tau_{epc})}(\vec{r})}{\max\{P_n^{(\tau_{epc})}(\vec{r})\}^2}[S_{tg}^{(\tau)}(\vec{r}) - S^{(\tau-1)}((\vec{r}))P_n^{(\tau_{epc})}(\vec{r})] \quad (28)$$

wherein $\max\{P_n^{(\tau_{epc})}(\vec{r})\}$ represents the maximal intensity value for the $n^{th}$ structured pattern, i.e., $P_n^{(\tau_{epc})}(\vec{r})$, in the $\tau_{epc}^{th}$ epoch. When the superscript of $\tau$−1, or $\tau_{epc}$, within the parentheses is equal to 0, the initial value in the associated term is used.

In some embodiments, the frequency components beyond the extension OTF support for the frequency contents of updated sample image may be blocked. The blocking process may be expressed as:

$$S^{(\tau)}(\vec{r}) := F^{-1}\{\tilde{S}'^{(\tau)}(\vec{k}) \cdot L_{Ext}\} \quad (29)$$

wherein, $\tilde{S}'^{(\tau)}(\vec{k}) = \mathcal{F}\{S'^{(\tau)}(\vec{r})\}$, $\mathcal{F}^{-1}\{\cdot\}$ represents inverse Fourier transform, and $L_{Ext}$ is a custom-built binary mask, given by:

$$L_{Ext} = \left(L3_{\vec{p}_{\theta_1}} \cup L3_{\vec{p}_{\theta_4}} \cup L3_{\vec{p}_{\theta_5}}\right) \oplus SE_3 \quad (30)$$

wherein $L3_{\vec{p}_{\theta_1}}, L3_{\vec{p}_{\theta_4}},$ and $L3_{\vec{p}_{\theta_5}}$ are binary tag images, found out by Eq. (7), "$\oplus$" is the dilation operator, $SE_3$ is a disk structure element object.

During the iterative optimization process, the structured pattern may be also adjusted. For example, the structured pattern may be adjusted by the updated target image and the modified sample image according to the equation:

$$P_n^{(\tau_{epc}+1)}(\vec{r}) := P_n^{(\tau_{epc})}(\vec{r}) + \frac{S^{(\tau)}(\vec{r})}{\max\{S^{(\tau)}(\vec{r})\}^2}[S_{tg}^{(\tau)}(\vec{r}) - S^{(\tau)}(\vec{r})P_n^{(\tau_{epc})}(\vec{r})] \quad (31)$$

wherein $P_n^{(\tau_{epc}+1)}(\vec{r})$ represents the $n^{th}$ updated structured pattern in $\tau^{th}$ iteration, $\max\{S^{(\tau)}(\vec{r})\}$ represents the maximal intensity value for the updated sample image, $S^{(\tau)}(\vec{r})$, $\tau$ and $\tau_{epc}$ are the iteration order number and epoch order number, respectively.

In some embodiments, another OTF updating step may be included to reduce the aberration effects. This updating step may be expressed as:

$$\tilde{H}'^{(\tau)}(\vec{k}) := \quad (32)$$

$$\tilde{H}^{(\tau-1)}(\vec{k}) + \frac{|\tilde{S}_{tg}^{(\tau)}(\vec{k})| \cdot \text{conj}\{\tilde{S}_{tg}^{(\tau)}(\vec{k})\} \cdot \{\tilde{S}^{(\tau)}(\vec{k}) - \tilde{H}^{(\tau-1)}(\vec{k}) \cdot \tilde{S}_{tg}^{(\tau)}(\vec{k})\}}{\max\{|\tilde{S}_{tg}^{(\tau)}(\vec{k})|\} \cdot \{\tilde{S}_{tg}^{(\tau)}(\vec{k}) \cdot \text{conj}\{\tilde{S}_{tg}^{(\tau)}(\vec{k})\} + \delta_r\}}$$

wherein $\tilde{H}^{(\tau)}(\vec{k})$ represents the updated OTF $\tau^{th}$ iteration, $|\cdot|$ is the modulus operator, $\max\{|\tilde{S}_{tg}^{(\tau)}(\vec{k})|\}$ represents the maximal intensity value in $|\tilde{S}_{tg}^{(\tau)}(\vec{k})|$, $\text{conj}\{\tilde{S}_{tg}^{(\tau)}(\vec{k})\}$ represents the complex conjugate of $\tilde{S}_{tg}^{(\tau)}(\vec{k})$, and $\delta_r$ is a positive regularization parameter to guarantee the denominator in Eq. (5-33).

The above iterative optimizing process are sequentially implemented on the entire set of structured patterns, i.e., $P_n^{(\tau_{epc}+1)}(\vec{r})$, n=1, 2, 3, 4, 5 or other natural number (in the embodiment, n=5 is taken as an example). This process may be defined as one updating epoch, wherein there are 5 iterations in each updating epoch. The iterative process continues until the MSE of the recovered high-resolution sample image within two consecutive epochs is smaller than a predefined tolerance. It should be noted that each structured pattern, i.e. $P_n^{(\tau_{epc}+1)}(\vec{r})$, is updated merely once within an epoch of updating, while the target image, i.e., $S_{tg}^{(\tau)}(\vec{r})$, the sample image, i.e., $S^{(\tau)}(\vec{r})$, and imaging system OTF, i.e., $\tilde{H}^{(\tau)}(\vec{k})$, are updated 5 times. When terminal criterion is satisfied, the optimizing process is stopped, and the recovered sample image is output as the high-resolution reconstruction result, represented as, $S_{rc}(\vec{r})$.

By above iterative optimizing process, fine modulated structures may be recovered in the initial sample image, and thus the finally obtained sample image may have higher resolution and beyond the resolution limit.

Optionally, a periodic artifact reducing process may be performed by using frequency filtering to suppress the residue peaks after the iterative optimizing process is terminated. Specifically, the periodic artifacts reducing process may be expressed as:

$$S_{sr}(\vec{r}) = \mathcal{F}^{-1}\{\tilde{S}_{sr}(\vec{k})\} = \mathcal{F}^{-1}\{\tilde{S}_{rc}(\vec{k}) \cdot \tilde{\Omega}(\vec{k})\} \quad (33)$$

where $\mathcal{F}^{-1}\{\cdot\}$ represents inverse Fourier transform, $\tilde{S}_{rc}(\vec{k})$ is given by: $\tilde{S}_{rc}(\vec{k}) = \mathcal{F}\{S_{rc}(\vec{r})\}$, and $\tilde{\Omega}(\vec{k})$ is a custom-designed filter, given by:

$$\tilde{\Omega}(\vec{k}) = \prod_{\vec{p}_{\theta_n}} \{[1 - \exp(-\alpha_0|\vec{k} - \vec{p}_{\theta_n}|^{\beta_0}) - \exp(-\alpha_0|\vec{k} - 2\vec{p}_{\theta_n}|^{\beta_0})] \cdot \quad (34)$$

$$[1 - \exp(-\alpha_0|\vec{k} + \vec{p}_{\theta_n}|^{\beta_0}) - \exp(-\alpha_0|\vec{k} + 2\vec{p}_{\theta_n}|^{\beta_0})]\}$$

where $|\cdot|$ is the modulus operator, $\alpha_0$ and $\beta_0$ are manually set parameters.

The present application also provides a system for data acquisition and image processing. The system may comprise a data acquisition system for obtaining a plurality of structured images of the object by structured light, a storage device for storing the plurality of structured images, and a data processing device. The storage device may be, but not limited to, a hard disk. The data processing device may comprise a processor and a memory coupled to the processor to store instructions, wherein the instructions cause the processor to perform operations for obtaining a super-resolved image of an object when executed by the processor. The operations may be the operations for performing the method for reconstructing a super-resolved image of an object described referring to FIGS. 1-5.

The present application further provides a non-transitory machine-readable medium having instructions stored therein, which when executed by a processor, cause the processor to perform operations for obtaining a super-resolved image of an object, the operations comprising: obtaining a plurality of structured images of the object by structured light; determining, from the structured images, modulation information of each structured light that comprises spatial frequency, phase shift and modulation factor; initializing a sample image of the object according the structured images and initializing structured pattern by the corresponding modulation information; and obtaining the super-resolved image by a plurality of epochs, wherein each epoch comprises:
  performing the following iteration for each structured pattern:
    determining a target image by applying the structured pattern to the sample image;
    updating frequency content of the determined target image according to difference between frequency content of the structured image and frequency content of the target image that is measurable to an imaging system used to capture the structured images;
    modifying the sample image as the super-resolved image according to difference between the target image and the target image obtained by the structured pattern adjusted in the last iteration; and
    adjusting the structured pattern by the updated target image and the modified sample image;
wherein the plurality of epochs are continued until difference between the updated sample images within two last epochs is smaller than a predetermined value.

In one embodiment, the spatial frequency is obtained by: exploring image coordinates of a peak intensity position for the frequency content of each edge tapered structured image by applying local maxima detection; and determining the spatial frequency vector of each structured light as the spatial frequency, based on the image coordinates.

In one embodiment, the obtaining of the spatial frequency further comprises: upsampling, around location of the determined spatial frequency vector, the frequency content of each edge tapered structured image; and adjusting the spatial frequency of each structured light to be maximum position in the upsampled frequency content of the corresponding edge tapered structured image.

In one embodiment, the phase shift is obtained by: constructing a structured pattern for each structured light by an initialized phase shift and the corresponding spatial frequency; and adjusting each initialized phase shift by minimizing difference between the structured pattern for each structured light and the corresponding structured images.

In one embodiment, the modulation factor is obtained by: extracting, according to transfer property of the imaging system for the each structured light, first frequency content from second frequency content of each structured image, wherein the second frequency content is determined by removing first frequency component from each structured image, and the first frequency component is out-of-focus frequency component; extracting, according to the transfer property of the imaging system for each structured light, third frequency content of each structured image from fourth frequency content of the corresponding structured image, wherein the fourth frequency content is determined by shifting low-grade estimated emission frequency content of each structured image with vector corresponding to the spatial frequency of the corresponding structured light and then filtering the shifted low-grade estimated emission frequency content according to the transfer property of the imaging system for the corresponding structured light; and determining modulation factor for each structured light based on the first and third frequency contents of each structured image.

In one embodiment, the transfer property of the imaging system for each structured light is determined by the optical transfer function of the imaging system and the shifted optical transfer functions of the imaging system, wherein the shifted optical transfer functions are obtained by shifting the optical transfer function of the sampling system by spatial frequency vectors of the structured light having different modulated frequencies.

In one embodiment, the out-of-focus frequency component is determined based on a widefield image that is obtained by averaging the structured images corresponding to the structure light having identical spatial frequency vector.

In one embodiment, the low-grade estimated emission frequency content is determined by: obtaining a widefield image by averaging the structured images corresponding to the structure light having identical spatial frequency vector; extracting signal power spectrum of the widefield image by removing noise power spectrum from power spectrum of the widefield image, wherein the noise power spectrum is determined by averaging the power spectrum with frequencies that are greater than a frequency threshold; initializing an estimated signal power spectrum by the optical transfer function of the sampling system, a first scale factor and a second scale factor; adjusting the first and second scale factor by minimizing difference between the estimated signal power spectrum and the extracted signal power spectrum; and suppressing noise outside of the optical transfer function support for frequency content of the widefield image.

In one embodiment, the sample image is initialized according to low-grade estimated emission frequency content of the corresponding structured image.

In one embodiment, the iteration further comprises: blocking frequency components beyond extension optical transfer function support for frequency contents of the updated sample image before the adjustment of the structured pattern.

In one embodiment, the iteration further comprises: updating the optical transfer function of the sampling system for each structured light according to the difference between the optical transfer functions within two last iterations.

In one embodiment, the operations further comprising: reducing periodic artifacts in the super-resolved image after the epoch is terminated.

In one embodiment, the obtaining of the plurality of structured images comprises: obtaining a plurality of structured images of the object by structured light; and storing the plurality of structured images in a permanent storage medium. For example, the plurality of structured images may be stored in a hard disk, and may be processed in the future in offline processing situation.

In one embodiment, the operations further comprise: before the determining of the modulation information of each structured light, reading the plurality of structured images from the permanent storage medium. For example, the plurality of structured images to be processed may be obtained by reading them from a hard disk in which the plurality of structured images is stored. In some embodiment, the plurality of structured images may be read directly from RAM.

Figure 6:
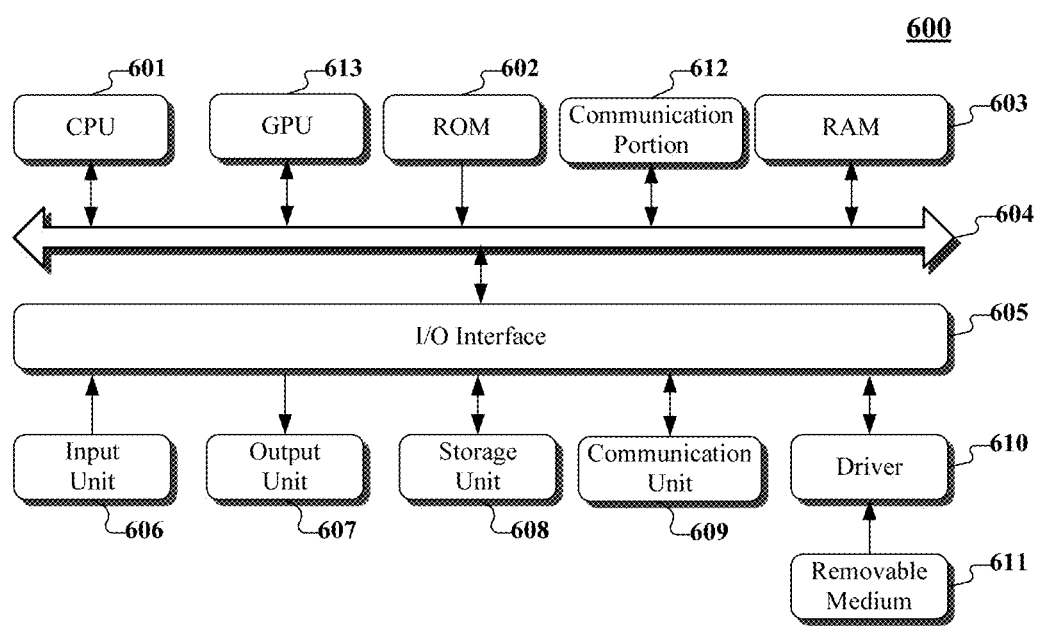
FIG. 6 is a schematic diagram illustrating a system adapted to implement the present application.

FIG. 6 is a schematic diagram illustrating a system adapted to implement the present application.

The system 600 may be a mobile terminal, a personal computer (PC), a tablet computer, a server, etc. In FIG. 6, the system 600 includes one or more processors, a communication portion, etc. The one or more processors may be: one or more central processing units (CPUs) 601 and/or one or more image processor (GPUs) 613 and/or one or more domain specific deep learning accelerator XPUs), etc. The processor may perform various suitable actions and processes in accordance with executable instructions stored in the read-only memory (ROM) 602 or executable instructions loaded from the storage unit 608 into the random access memory (RAM) 603. The communication portion 612 may include, but is not limited to a network card and/or specific media receivers. The network card may include, but is not limited to an IB (Infiniband) network card. The specific media receivers may include, but is not limited to a high definition SDI image/video receiver. The processor may communicate with the read-only memory 602 and/or the RAM 603 to execute the executable instructions, connect to the communication portion 612 through the bus 604 and communicate with other target devices through the communication portion 612 to complete the corresponding step in the present application. In a specific example of the present application, the steps performed by the processor includes: obtaining a plurality of structured images of the object by structured light; determining, from the structured images, modulation information of each structured light that comprises spatial frequency, phase shift and modulation factor; initializing a sample image of the object according the structured images and initializing structured pattern of each structured light by the corresponding modulation information; and obtaining the super-resolved image by the following epoch:

performing the following iteration for each structured pattern:
determining a target image by applying the structured pattern to the sample image;
updating frequency content of the determined target image according to difference between frequency content of the structured image and frequency content of the target image that is measurable to an imaging system used to capture the structured images;

modifying the sample image as the super-resolved image according to difference between the target image and the target image obtained by the structured pattern adjusted in the last iteration; and adjusting the structured pattern by the updated target image and the modified sample image; and continuing the epoch until difference between the updated sample images within two last epochs is smaller than a predetermined value.

In addition, in the RAM 603, various programs and data required by operation of the apparatus may also be stored. The CPU 601, the ROM 602 and the RAM 603 are connected to each other through the bus 604. Where RAM 603 exists, the ROM 602 is an optional module. The RAM 603 stores executable instructions or writes executable instructions to the ROM 602 during operation, and the executable instructions cause the central processing unit 601 to perform the steps included in the method of any of the embodiments of the present application. The input/output (I/O) interface 605 is also connected to the bus 604. The communication portion 612 may be integrated, and may also be provided with a plurality of sub-modules (e.g., a plurality of D3 network cards) and connected to the bus 604, respectively.

The following components are connected to the I/O interface 605: an input unit 606 including a keyboard, a mouse, and the like; an output unit 607 including such as a cathode ray tube (CRT), a liquid crystal display (LCD) and a loudspeaker, and the like; a storage unit 608 including a hard disk, and the like; and a communication unit 609 including a network interface card such as a LAN card, a modem, and the like. The communication unit 609 performs communication processing via a network such as the Internet and/or an USB interface and/or a PCIE interface. A driver 610 also connects to the I/O interface 605 as needed. A removable medium 611, such as a magnetic disk, an optical disk, a magneto-optical disk, a semiconductor memory, is installed on the driver 610 as needed so that the computer programs read therefrom are installed in the storage unit 608 as needed.

It should be noted that the architecture shown in FIG. 6 is only an alternative implementation. During the specific practice process, the number and types of parts as shown in FIG. 6 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described above with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the method provided by any of the embodiments of the present application, including: obtaining a plurality of structured images of the object by structured light; determining, from the structured images, modulation information of each structured light that comprises spatial frequency, phase shift and modulation factor; initializing a sample image of the object according the structured images and initializing structured pattern of each structured light by the corresponding modulation information; and obtaining the super-resolved image by the following epoch:

performing the following iteration for each structured pattern:

determining a target image by applying the structured pattern to the sample image;

updating frequency content of the determined target image according to difference between frequency content of the structured image and frequency content of the target image that is measurable to an imaging system used to capture the structured images;

modifying the sample image as the super-resolved image according to difference between the target image and the target image obtained by the structured pattern adjusted in the last iteration; and adjusting the structured pattern by the updated target image and the modified sample image; and continuing the epoch until difference between the updated sample images within two last epochs is smaller than a predetermined value.

In such embodiments, the computer program may be downloaded and installed from the network through the communication unit 609, and/or installed from the removable medium 611. When the computer program is executed by the central processing unit (CPU) 601 and/or GPU 613 and/or XPU, the above-described instruction described in the present application is executed.

As will be appreciated by one skilled in the art, the disclosure may be embodied as a system, a method or an apparatus with domain specific hardware and computer program product. Accordingly, the disclosure may take the form of an entirely hardware embodiment and hardware aspects that may all generally be referred to herein as a "unit", "circuit," "module" or "system." Much of the inventive functionality and many of the inventive principles when implemented, are best supported with or integrated circuits (ICs), such as a digital signal processor, graphic processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the disclosure, further discussion of such software and ICs, if any, will be limited to the essentials with respect to the principles and concepts used by the preferred embodiments. In addition, the present invention may take the form of an entirely software embodiment (including firmware, resident software, micro-code, etc.) or an embodiment combining software. For example, the system may comprise a memory that stores executable components and a processor, electrically coupled to the memory to execute the executable components to perform operations of the system, as discussed in reference to FIGS. 1-6. Furthermore, the present invention may take the form of a computer program product embodied in any tangible medium of expression having computer-usable program code embodied in the medium.

Although the preferred examples of the disclosure have been described, those skilled in the art can make variations or modifications to these examples upon knowing the basic inventive concept. The appended claims are intended to be considered as comprising the preferred examples and all the variations or modifications fell into the scope of the disclosure.

Obviously, those skilled in the art can make variations or modifications to the disclosure without departing the spirit and scope of the disclosure. As such, if these variations or modifications belong to the scope of the claims and equivalent technique, they may also fall into the scope of the disclosure.

What is claimed is:

1. A method for obtaining a super-resolved image of an object, comprising:
    acquiring a plurality of structured images of the object by structured light;
    determining, from the structured images, modulation information of each structured light that comprises spatial frequency, phase shift and modulation factor;
    initializing a sample image of the object according the structured images and initializing structured pattern by the corresponding modulation information; and
    obtaining the super-resolved image by a plurality of epochs, wherein each epoch comprises:
        performing the following iteration for each structured pattern:
            determining a target image by applying the structured pattern to the sample image;
            updating frequency content of the determined target image according to difference between frequency content of the structured image and frequency content of the target image that is measurable to an imaging system used to capture the structured images;
            modifying the sample image as the super-resolved image according to difference between the target image and the target image obtained by the structured pattern adjusted in the last iteration; and
            adjusting the structured pattern by the updated target image and the modified sample image,
    wherein the plurality of epochs are continued until difference between the updated sample images within two last epochs is smaller than a predetermined value.

2. The method of claim 1, wherein the spatial frequency is obtained by:
    exploring image coordinates of a peak intensity position for the frequency content of each edge tapered structured image by applying local maxima detection; and
    determining the spatial frequency vector for each structured image, based on the image coordinates.

3. The method of claim 2, wherein the obtaining of the spatial frequency further comprises:
    upsampling, around the location of the determined spatial frequency vector, the frequency content of each edge tapered structured image; and
    adjusting the spatial frequency of each structured light to be maximum position in the upsampled frequency content of the corresponding edge tapered structured image.

4. The method of claim 1, wherein the phase shift is obtained by:
    constructing the structured pattern for each structured light by an initialized phase shift and the corresponding spatial frequency; and
    adjusting each initialized phase shift by minimizing correlation difference between the structured pattern for each structured light and the corresponding structured images.

5. The method of claim 1, wherein the modulation factor is obtained by:
    extracting, according to transfer property of the imaging system for each structured light, first frequency content from second frequency content of each structured image, wherein the second frequency content is determined by removing first frequency component from each structured image, and the first frequency component is out-of-focus frequency component;
    extracting, according to the transfer property of the imaging system for each structured light, third frequency content of each structured image from fourth frequency content of the corresponding structured image, wherein the fourth frequency content is determined by shifting low-grade estimated emission frequency content of each structured image with vector corresponding to the spatial frequency of the corresponding structured light and then filtering the shifted low-grade estimated emission frequency content according to the transfer property of the imaging system for the corresponding structured light; and
    determining modulation factor for each structured light based on the first and third frequency contents of each structured image.

6. The method of claim 5, wherein the transfer property of the imaging system for each structured light is determined by the optical transfer function of the imaging system and the shifted optical transfer functions of the imaging system, wherein the shifted optical transfer functions are obtained by shifting the optical transfer function of the sampling system by spatial frequency vectors of the structured light having different modulated frequencies.

7. The method of claim 5, wherein the out-of-focus frequency component is determined based on a widefield image that is obtained by averaging the structured images corresponding to the structured light having identical spatial frequency vector.

8. The method of claim 5, the low-grade estimated emission frequency content is determined by:
    obtaining a widefield image by averaging the structured images having identical spatial frequency vector;
    extracting signal power spectrum of the widefield image by removing noise power spectrum from power spectrum of the widefield image, wherein the noise power spectrum is determined by averaging the power spectrum with frequencies that are greater than a frequency threshold;
    initializing an estimated signal power spectrum by the optical transfer function of the sampling system, a first scale factor and a second scale factor;
    adjusting the first and second scale factor by minimizing difference between the estimated signal power spectrum and the extracted signal power spectrum; and
    removing noise outside of the optical transfer function support for frequency content of the widefield image.

9. The method of claim 1, wherein the sample image is initialized according to low-grade estimated emission frequency content of the corresponding structured image.

10. The method of claim 1, wherein the iteration further comprises:

blocking frequency components beyond extension optical transfer function support for frequency contents of the updated sample image before the adjustment of the structured pattern.

11. The method of claim 1, wherein the iteration further comprises:
updating the optical transfer function of the sampling system for each structured light according to the difference between the optical transfer functions within two last iterations.

12. The method of claim 1, further comprising:
reducing periodic artifacts in the super-resolved image after the epochs are terminated.

13. A non-transitory machine-readable medium having instructions stored therein, which when executed by a processor, cause the processor to perform operations for obtaining a super-resolved image of an object, the operations comprising:
acquiring a plurality of structured images of the object by structured light;
determining, from the structured images, modulation information of each structured light that comprises spatial frequency, phase shift and modulation factor;
initializing a sample image of the object according the structured images and initializing structured pattern by the corresponding modulation information; and
obtaining the super-resolved image by a plurality of epochs, wherein each epoch comprises:
performing the following iteration for each structured pattern:
determining a target image by applying the structured pattern to the sample image;
updating frequency content of the determined target image according to difference between frequency content of the structured image and frequency content of the target image that is measurable to an imaging system used to capture the structured images;
modifying the sample image as the super-resolved image according to difference between the target image and the target image obtained by the structured pattern adjusted in the last iteration; and
adjusting the structured pattern by the updated target image and the modified sample image,
wherein the plurality of epochs are continued until difference between the updated sample images within two last epochs is smaller than a predetermined value.

14. The non-transitory machine-readable medium of claim 13, wherein the spatial frequency is obtained by:
exploring image coordinates of a peak intensity position for the frequency content of each edge tapered structured image by applying local maxima detection; and
determining the spatial frequency vector of each structured light, based on the image coordinates.

15. The non-transitory machine-readable medium of claim 14, wherein the obtaining of the spatial frequency further comprises:
upsampling, around location of the determined spatial frequency vector, the frequency content of each edge tapered structured image; and
adjusting the spatial frequency of each structured light to be maximum position in the upsampled frequency content of the corresponding edge tapered structured image.

16. The non-transitory machine-readable medium of claim 13, wherein the phase shift is obtained by:

constructing a structured pattern for each structured light by an initialized phase shift and the corresponding spatial frequency; and
adjusting each initialized phase shift by minimizing correlation difference between the structured pattern for each structured light and the corresponding structured images.

17. The non-transitory machine-readable medium of claim 13, wherein the modulation factor is obtained by:
extracting, according to transfer property of the imaging system for each structured light, first frequency content from second frequency content of each structured image, wherein the second frequency content is determined by removing first frequency component from each structured image, and the first frequency component is out-of-focus frequency component;
extracting, according to the transfer property of the imaging system for each structured light, third frequency content of each structured image from fourth frequency content of the corresponding structured image, wherein the fourth frequency content is determined by shifting low-grade estimated emission frequency content of each structured image with vector corresponding to the spatial frequency of the corresponding structured light and then filtering the shifted low-grade estimated emission frequency content according to the transfer property of the imaging system for the corresponding structured light; and
determining modulation factor for each structured light based on the first and third frequency contents of each structured image.

18. The non-transitory machine-readable medium of claim 17, wherein the transfer property of the imaging system for each structured light is determined by the optical transfer function of the imaging system and the shifted optical transfer functions of the imaging system,
wherein the shifted optical transfer functions are obtained by shifting the optical transfer function of the sampling system by spatial frequency vectors of the structured light having different modulated frequencies.

19. The non-transitory machine-readable medium of claim 17, wherein the out-of-focus frequency component is determined based on a widefield image that is obtained by averaging the structured images corresponding to the structured light having identical spatial frequency vector.

20. The non-transitory machine-readable medium of claim 17, the low-grade estimated emission frequency content is determined by:
obtaining a widefield image by averaging the structured images having identical spatial frequency vector;
extracting signal power spectrum of the widefield image by removing noise power spectrum from power spectrum of the widefield image, wherein the noise power spectrum is determined by averaging the power spectrum with frequencies that are greater than a frequency threshold;
initializing an estimated signal power spectrum by the optical transfer function of the sampling system, a first scale factor and a second scale factor;
adjusting the first and second scale factor by minimizing difference between the estimated signal power spectrum and the extracted signal power spectrum; and
removing noise outside of the optical transfer function support for frequency content of the widefield image.

21. The non-transitory machine-readable medium of claim 13, wherein the sample image is initialized according to low-grade estimated emission frequency content of the corresponding structured image.

22. The non-transitory machine-readable medium of claim 13, wherein the iteration further comprises:
blocking frequency components beyond extension optical transfer function support for frequency contents of the updated sample image before the adjustment of the structured pattern.

23. The non-transitory machine-readable medium of claim 13, wherein the iteration further comprises:
updating the optical transfer function of the sampling system for each structured light according to the difference between the optical transfer functions within two last iterations.

24. The non-transitory machine-readable medium of claim 13, the operations further comprising:
reducing periodic artifacts in the super-resolved image after the epochs are terminated.

25. The non-transitory machine-readable medium of claim 13, the acquiring of the plurality of structured images comprising:
acquiring a plurality of structured images of the object by structured light; and
storing the plurality of structured images in a permanent storage medium.

26. The non-transitory machine-readable medium of claim 25, the operations further comprising:
before the determining of the modulation information of each structured light, reading the plurality of structured images from the permanent storage medium.

27. A data acquisition and image processing system, comprising:
a processor; and
a memory coupled to the processor to store instructions, which when executed by the processor, cause the processor to perform operations for obtaining a super-resolved image of an object, the operations comprising:
acquiring a plurality of structured images of the object by structured light;
determining, from the structured images, modulation information of each structured light that comprises spatial frequency, phase shift and modulation factor;
initializing a sample image of the object according the structured images and initializing structured pattern by the corresponding modulation information; and
obtaining the super-resolved image by a plurality of epochs, wherein each epoch comprises:
performing the following iteration for each structured pattern:
determining a target image by applying the structured pattern to the sample image;
updating frequency content of the determined target image according to difference between frequency content of the structured image and frequency content of the target image that is measurable to an imaging system used to capture the structured images;
modifying the sample image as the super-resolved image according to difference between the target image and the target image obtained by the structured pattern adjusted in the last iteration; and
adjusting the structured pattern by the updated target image and the modified sample image,
wherein the plurality of epochs are continued until difference between the updated sample images within two last epochs is smaller than a predetermined value.

28. The data processing system of claim 27, wherein the spatial frequency is obtained by:
exploring image coordinates of a peak intensity position for the frequency content of each edge tapered structured image by applying local maxima detection; and
determining the spatial frequency vector of each structured light, based on the image coordinates.

29. The data processing system of claim 28, wherein the obtaining of the spatial frequency further comprises:
upsampling, around the location of the determined spatial frequency vector, the frequency content of each edge tapered structured image; and
adjusting the spatial frequency of each structured light to be maximum position in the upsampled frequency content of the corresponding edge tapered structured image.

30. The data processing system of claim 27, wherein the phase shift is obtained by:
constructing a structured pattern for each structured light by an initialized phase shift and the corresponding spatial frequency; and
adjusting each initialized phase shift by minimizing correlation difference between the structured pattern for each structured light and the corresponding structured images.

31. The data processing system of claim 27, wherein the modulation factor is obtained by:
extracting, according to transfer property of the imaging system for each structured light, first frequency content from second frequency content of each structured image, wherein the second frequency content is determined by removing first frequency component from each structured image, and the first frequency component is out-of-focus frequency component;
extracting, according to the transfer property of the imaging system for each structured light, third frequency content of each structured image from fourth frequency content of the corresponding structured image, wherein the fourth frequency content is determined by shifting low-grade estimated emission frequency content of each structured image with vector corresponding to the spatial frequency of the corresponding structured light and then filtering the shifted low-grade estimated emission frequency content according to the transfer property of the imaging system for the corresponding structured light; and
determining modulation factor for each structured light based on the first and third frequency contents of each structured image.

32. The data processing system of claim 31, wherein the transfer property of the imaging system for each structured light is determined by the optical transfer function of the imaging system and the shifted optical transfer functions of the imaging system,
wherein the shifted optical transfer functions are obtained by shifting the optical transfer function of the sampling system by spatial frequency vectors of the structured light having different modulated frequencies.

33. The data processing system of claim 31, wherein the out-of-focus frequency component is determined based on a widefield image that is obtained by averaging the structured images corresponding to the structured light having identical spatial frequency vector.

34. The data processing system of claim 31, the low-grade estimated emission frequency content is determined by:
obtaining a widefield image by averaging the structured images having identical spatial frequency vector;

extracting signal power spectrum of the widefield image by removing noise power spectrum from power spectrum of the widefield image, wherein the noise power spectrum is determined by averaging the power spectrum with frequencies that are greater than a frequency threshold;

initializing an estimated signal power spectrum by the optical transfer function of the sampling system, a first scale factor and a second scale factor;

adjusting the first and second scale factor by minimizing difference between the estimated signal power spectrum and the extracted signal power spectrum; and removing noise outside of the optical transfer function support for frequency content of the widefield image.

35. The data processing system of claim 27, wherein the sample image is initialized according to low-grade estimated emission frequency content of the corresponding structured image.

36. The data processing system of claim 27, wherein the iteration further comprises:

blocking frequency components beyond extension optical transfer function support for frequency contents of the updated sample image before the adjustment of the structured pattern.

37. The data processing system of claim 27, wherein the iteration further comprises:

updating the optical transfer function of the sampling system for each structured light according to the difference between the optical transfer functions within two last iterations.

38. The data processing system of claim 27, the operations further comprising:

reducing periodic artifacts in the super-resolved image after the epochs are terminated.

39. The data processing system of claim 27, the acquiring of the plurality of structured images comprising:

acquiring a plurality of structured images of the object by structured light; and storing the plurality of structured images in a permanent storage medium.

40. The data processing system of claim 39, the operations further comprising:

before the determining of the modulation information of each structured light, reading the plurality of structured images from the permanent storage medium.

41. A system for data acquisition and image processing, comprising:

a data acquisition device for acquiring a plurality of structured images of the object by structured light;

a storage device for storing the plurality of structured images; and a data processing device comprising:

a processor; and a memory coupled to the processor to store instructions, which when executed by the processor, cause the processor to perform operations for obtaining a super-resolved image of an object, the operations comprising:

determining, from the structured images, modulation information of each structured light that comprises spatial frequency, phase shift and modulation factor;

initializing a sample image of the object according the structured images and initializing structured pattern by the corresponding modulation information; and obtaining the super-resolved image by a plurality of epochs, wherein each epoch comprises:

performing the following iteration for each structured pattern:

determining a target image by applying the structured pattern to the sample image;

updating frequency content of the determined target image according to difference between frequency content of the structured image and frequency content of the target image that is measurable to an imaging system used to capture the structured images;

modifying the sample image as the super-resolved image according to difference between the target image and the target image obtained by the structured pattern adjusted in the last iteration; and adjusting the structured pattern by the updated target image and the modified sample image, wherein the plurality of epochs are continued until difference between the updated sample images within two last epochs is smaller than a predetermined value.

* * * * *